United States Patent
Ghannam et al.

(10) Patent No.: US 10,941,602 B2
(45) Date of Patent: Mar. 9, 2021

(54) SYSTEM AND METHOD FOR POWER TAILGATE SAFETY

(71) Applicant: Ford Global Technologies, LLC, Dearborn, MI (US)

(72) Inventors: Mahmoud Yousef Ghannam, Canton, MI (US); Muhannad Anwar Hamdan, Canton, MI (US); Raed Younis, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 237 days.

(21) Appl. No.: 16/183,344

(22) Filed: Nov. 7, 2018

(65) Prior Publication Data
US 2020/0141171 A1    May 7, 2020

(51) Int. Cl.
| E05F 15/40 | (2015.01) |
| B62D 33/027 | (2006.01) |
| B60Q 5/00 | (2006.01) |
| E05F 15/73 | (2015.01) |
| E05F 15/53 | (2015.01) |

(52) U.S. Cl.
CPC ............. *E05F 15/40* (2015.01); *B60Q 5/005* (2013.01); *B62D 33/0273* (2013.01); *E05F 15/53* (2015.01); *E05F 15/73* (2015.01); *E05F 2015/767* (2015.01); *E05Y 2400/44* (2013.01); *E05Y 2400/55* (2013.01); *E05Y 2900/546* (2013.01)

(58) Field of Classification Search
None
See application file for complete search history.

(56) References Cited

U.S. PATENT DOCUMENTS

| 6,411,054 | B1 | 6/2002 | Van Wiemeersch |
| 7,070,226 | B2 | 7/2006 | Cleland et al. |
| 8,089,237 | B2 | 1/2012 | Bernhard et al. |
| 8,635,809 | B2 | 1/2014 | Wuerstlein et al. |
| 9,470,034 | B2 | 10/2016 | Ihlenburg et al. |
| 10,613,219 | B1 * | 4/2020 | DeCia ................. G01S 13/931 |
| 2004/0095250 | A1 | 5/2004 | Chapman et al. |
| 2007/0065262 | A1 * | 3/2007 | Murphy ............... B60P 1/4471 414/462 |
| 2007/0140821 | A1 * | 6/2007 | Garon ...................... B25J 9/026 414/618 |
| 2007/0262603 | A1 * | 11/2007 | Robertson ........... B60R 25/1004 296/57.1 |
| 2009/0079217 | A1 * | 3/2009 | Bakshi ................... B60P 1/435 296/61 |
| 2015/0127208 | A1 * | 5/2015 | Jecker ....................... B62D 1/00 701/23 |
| 2016/0160553 | A1 * | 6/2016 | Nania ................ B62D 33/0273 296/50 |

(Continued)

FOREIGN PATENT DOCUMENTS

KR    20180070291 A    6/2018

*Primary Examiner* — Lori L Lyjak
(74) *Attorney, Agent, or Firm* — Frank Lollo; Eversheds Sutherland (US) LLP

(57) ABSTRACT

A pick-up truck includes a pick-up bed, a tailgate connected to the pick-up bed, a motor configured to move the tailgate along a path, a camera, and processors. The processors stop the tailgate while the tailgate is automatically moving in response to detecting, via the camera, any object within the path.

20 Claims, 7 Drawing Sheets

(56) References Cited

U.S. PATENT DOCUMENTS

| | | | | |
|---|---|---|---|---|
| 2017/0120867 A1* | 5/2017 | Beauvais | ................ | B60R 25/24 |
| 2017/0167178 A1* | 6/2017 | Lee | ........................ | E05F 1/002 |
| 2017/0282718 A1* | 10/2017 | Malek | ....................... | B60L 1/00 |
| 2018/0001820 A1* | 1/2018 | Higgins | ............. | B62D 33/0273 |
| 2019/0228235 A1* | 7/2019 | Murad | ............... | G06K 9/00791 |
| 2019/0292833 A1* | 9/2019 | Lamm | ..................... | E05F 15/70 |
| 2019/0330907 A1* | 10/2019 | Marchlewski | ..... | B62D 33/0273 |

* cited by examiner

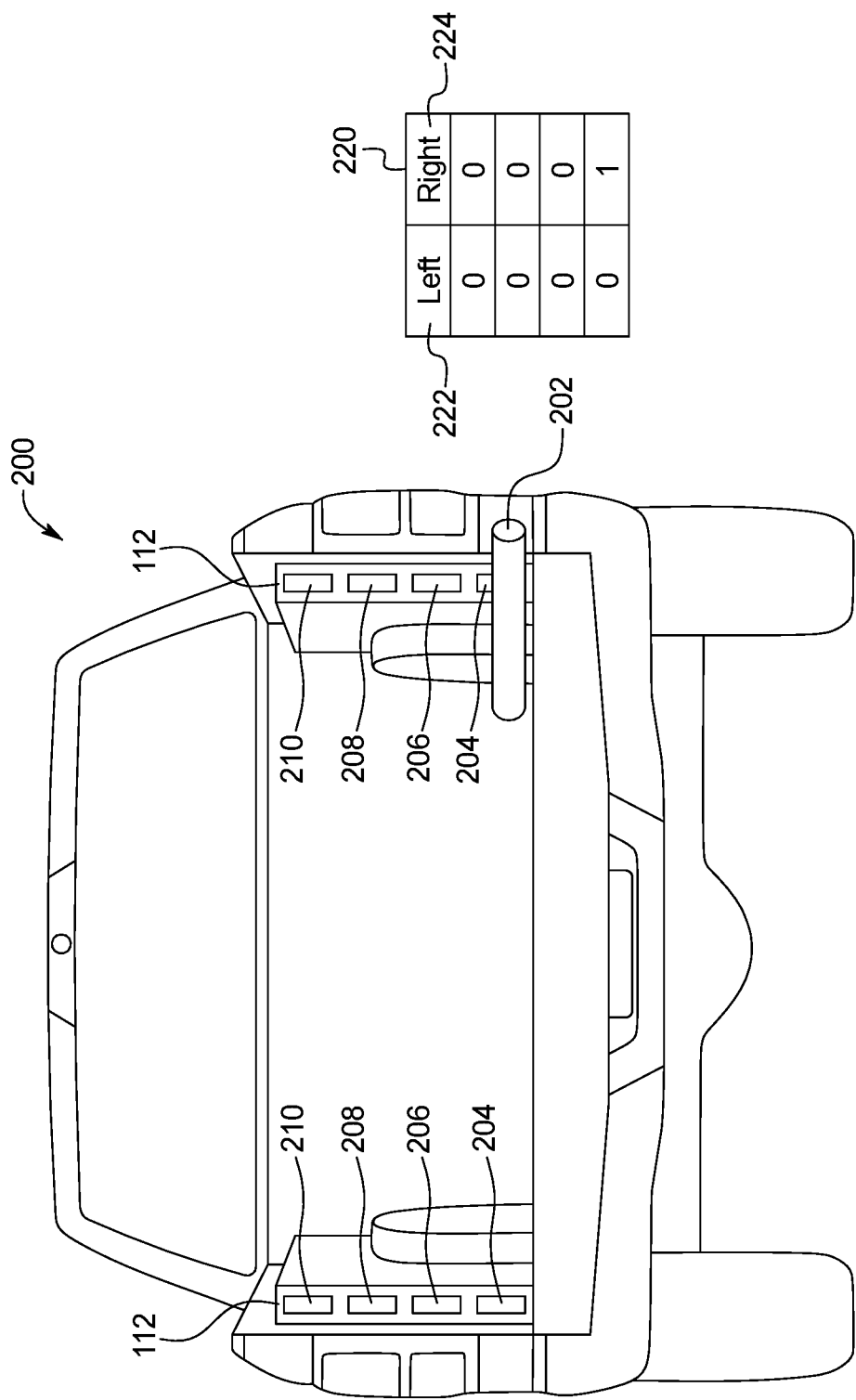

SYSTEM AND METHOD FOR POWER TAILGATE SAFETY

TECHNICAL FIELD

The present disclosure generally relates to systems and methods for power tailgate safety and, more specifically, systems and methods for monitoring and operating a power tailgate of a pick-up truck.

BACKGROUND

Pick-up trucks include a tailgate for providing access to a cargo space. Recently, movements of the tailgate have been automated for a user's convenience. Therefore, there is a need for monitoring the moving path of the automated tailgate.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example pick-up truck, method, and non-transitory, computer readable medium are described herein. An example pick-up truck includes a pick-up bed, a tailgate connected to the pick-up bed, a motor configured to move the tailgate along a path, a camera and processors. The processors stop the tailgate while the tailgate is automatically moving in response to detecting, via the camera, any object within the path, An example method of operating a tailgate of a pick-up truck includes automatically moving the tailgate along a path via a motor, and while the tailgate is automatically moving, responsive to detecting, via a camera, any object within the path, stopping the tailgate.

An example non-transitory, computer readable medium stores instructions that are executable by at least one processor to perform operations. The operations include automatically moving a tailgate along a path via a motor, and while the tailgate is automatically moving, responsive to detecting, via a camera, any object within the path, stopping the tailgate.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

FIG. 2 illustrate an example scenario demonstrating an improper contact between a power tailgate and a contact surfaces of the pick-up truck of FIGS. 1A and 1B.

DETAILED DESCRIPTION OF EXAMPLE EMBODIMENTS

Figure 1A:
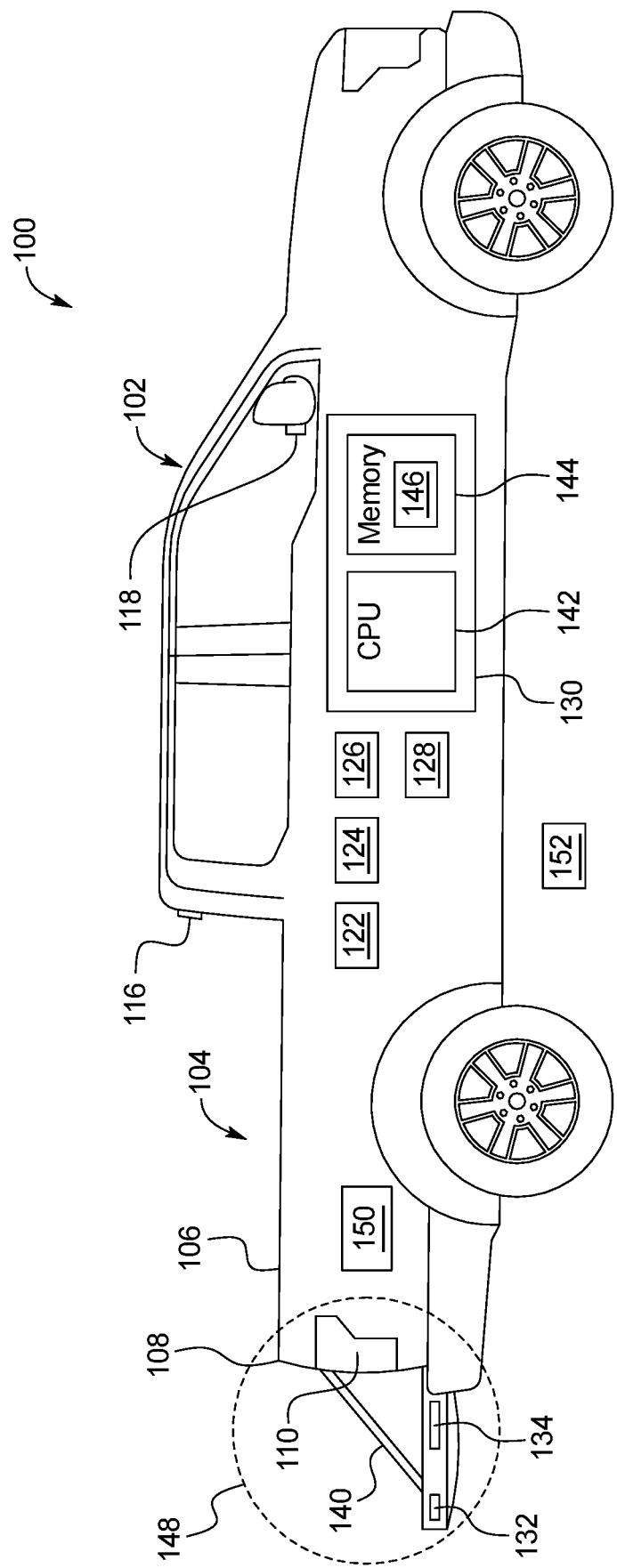
FIGS. 1A and 1B illustrate a pick-up truck in accordance with this disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

A conventional pick-up truck includes a pick-up bed that is accessible through a tailgate. Generally, a tailgate is hingedly attached to a rear frame of the pick-up bed and is operable to move between an open position and a closed position. Recently, tailgates have been manufactured to automate movements between the open position and the closed position in response to a user input. While such automated tailgates provide convenience to a user, it also impose safety hazards to a user and may cause damage to items disposed by in the pick-up bed.

As used herein, a pick-up truck refers to a light-duty truck having an enclosed cabin and an open cargo area with low sides and a tailgate.

As disclosed below, a pick-up truck includes a pick-up bed and a cabin connected to the pick-up bed. The rear side of the pick-up bed includes a power tailgate. The power tailgate is operable to automatically move between a closed position and an open position based on a user input. The pick-up truck further includes a bed camera, side mirror cameras, tailgate torque sensors, tactile sensors, a control module, and a warning system. The bed camera is disposed on an external surface of the cabin facing the power tailgate. The bed camera monitors an operating zone of the tailgate. The operating zone includes a closing/opening path of the tailgate. The side mirror cameras also monitor the operating zone. The side mirror cameras may work in conjunction with the bed camera to monitor the operating zone. The side mirror cameras may be activated only when the bed camera is unavailable or when its field of view (FOV) becomes obstructed. The tailgate torque sensors are coupled to the power tailgate to sense an amount of force applied to the power tailgate. The tactile sensors are disposed on truck tails defined by rear walls surrounding the pick-up bed. The tactile sensors are activated when the power tailgate is fully closed. The control module analyzes data transmitted from the bed camera, the side mirror cameras, the tailgate torque sensors, and the tactile sensors, and based on the analyzed data, provides one or more commands to the power tailgate and/or the warning system. The control module may provide a command to adjust the power tailgate and/or provide a warning via the warning system when an object is detected within the closing/opening path of the power tailgate. While the power tailgate is in motion, the control module may provide a command to adjust the power tailgate and/or provide a warning via the warning system when an object is detected within the closing/opening path of the power tailgate and/or when an amount of force applied to the power tailgate fails to satisfy a threshold. The control module may further provide a command to adjust the power tailgate and/or provide a warning via the warning system when the power tailgate is in the closed position and less than all of the tactile switches are activated. The warning system includes one or more displays and/or speakers. The warning system may be further coupled to at least one mobile device.

Figure 1B:
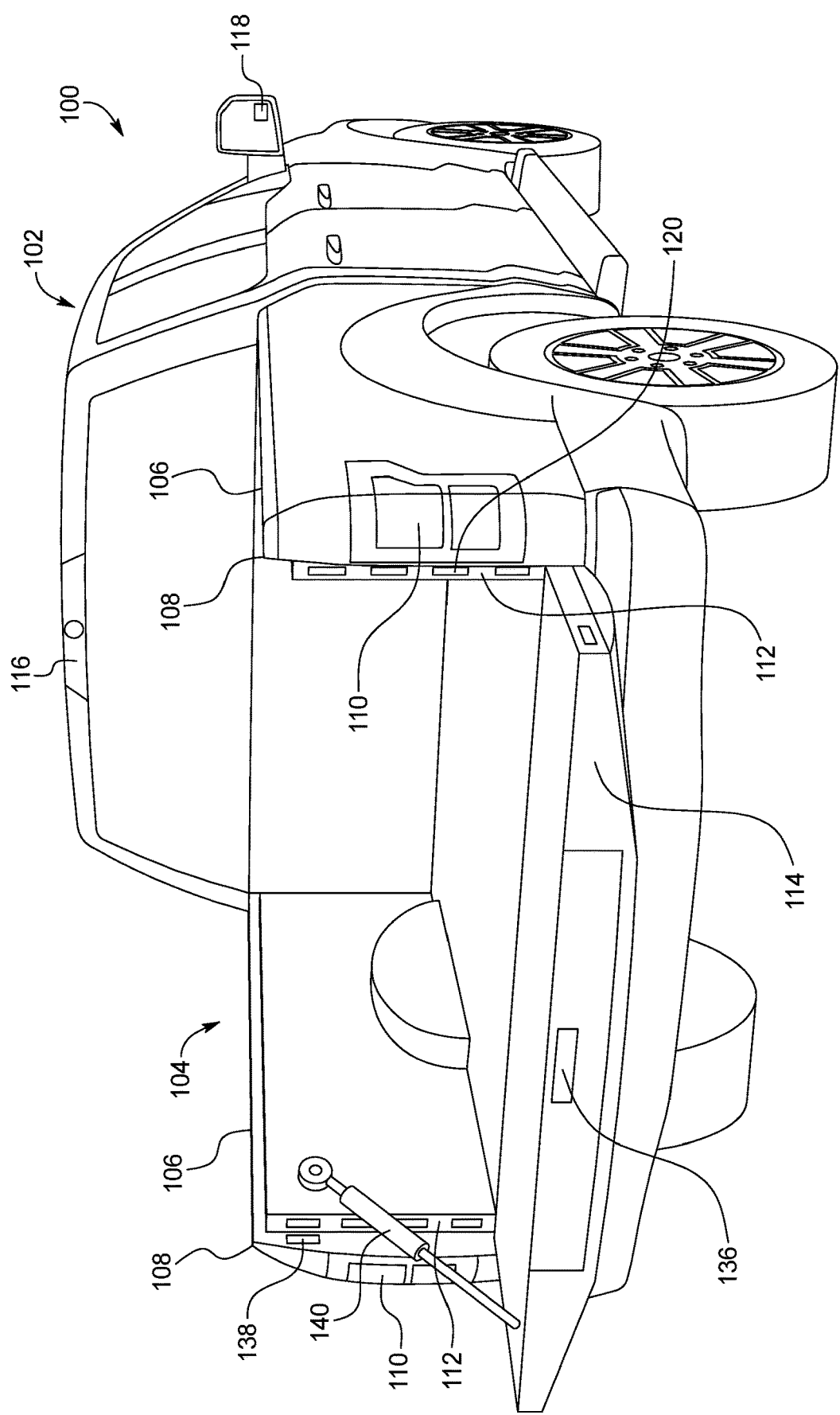

FIGS. 1A and 1B illustrate a pick-up truck 100 in accordance with this disclosure. The pick-up truck may be a standard gasoline powered vehicle, a hybrid vehicle, an electric vehicle, a fuel cell vehicle, and/or any other mobility implement type of vehicle. pick-up truck includes parts related to mobility, such as a powertrain with an engine, a transmission, a suspension, a driveshaft, and/or wheels, etc. The pick-up truck may be a semi-autonomous vehicle (e.g., some routine motive functions, such as parking, are controlled by vehicle), or an autonomous vehicle (e.g., motive functions are controlled by the vehicle without direct driver input).

In the illustrated examples, the pick-up truck 100 includes a cabin 102 and a pick-up bed 104. The cabin 102 provides a housing for passengers and/or a driver. The pick-up bed 104 is a cargo space for storing loads and is connected to the rear side of the cabin 102. The pick-up bed 104 is partially enclosed via walls 106. The rear side of the walls 106 define truck tails 108. Each of the truck tails 108 include a tail light 110 and a contact surface 112. The pick-up truck 100 further includes a power tailgate 114, a bed camera 116, side mirror cameras 118, tactile sensors 120, tailgate torque sensors 122, an infotainment head unit 124, a communication module 126, a warning system 128, and an on-board computing platform 130. While FIG. 1B does not illustrate the tailgate torque sensors 122, the infotainment head unit 124, the communication module 126, the warning system 128, and the on-board computing platform 130, it should be appreciated that such devices are disposed within the external housing pick-up truck 100. It should be appreciated that the power tailgate 114, the bed camera 116, the side mirror cameras 118, the tactile sensors 120, the tailgate torque sensors 122, the infotainment head unit 124, the communication module 126, the warning system 128, and the on-board computing platform 130 are communicatively coupled. For example, one or more of such devices may be electrically coupled via one or more wires (not illustrated) and/or wirelessly coupled via one or more transceivers (not illustrated).

The power tailgate 114 is connected to the rear side of the pick-up bed 104 and is operable to automatically move between a closed position and an open position. In the illustrated examples, the power tailgate 114 is in the open position. When power tailgate 114 is in the closed position, the power tailgate 114 contacts the contact surface 112 and forms a partial enclosure with the walls 106. In the illustrated examples, the power tailgate 114 is hingedly connected to a lower, rear frame of the pick-up bed 104. It should be appreciated that the power tailgate 114 may be connected to the rear side of the pick-up bed 104 via other orientations. For example, the power tailgate 114 may be hingedly connected to one of the walls 106. In the illustrated example, the power tailgate 114 includes latches 132, a power driver unit 134, and a switch 136. The latches 132 engages and interlocks with slots 138 defined on the truck tails 108 when the power tailgate 114 is in the closed position. Each of the latches 132 are disposed on opposite ends of the power tailgate 114. In some examples, the latches 132 may operate as sensors for indicating that the power tailgate 114 is in the closed position. In the illustrated example, the power tailgate 114 is further connected to one of the walls 106 via a mechanical arm 140. The mechanical arm 140 is electrically coupled with the power driver unit 134 and is operable with the power driver unit 134 to move the power tailgate 114 between the closed position and the open position. In The power driver unit 134 may include at least one motor 150 and at least one electronic control unit (ECU) (not illustrated). In some examples, one or more hinges (not illustrated) connecting the power tailgate 114 and the pick-up bed 104 may include be torsion motors (not illustrated). The torsion motor may be driven by the power driver unit 134 to move the power tailgate 140 between the closed position and the open position. In some examples, an arm or a hinge connecting the power tailgate and the pick-up bed 104 may be a hydraulic or pneumatic devices. The hydraulic or pneumatic devices may be driven by the power driver unit 134 to move the power tailgate 140. The switch 136 serves as a trigger for causing the power tailgate 114 to move. It should be appreciated that the power tailgate 114 may be actuated to move in response to other forms of triggers. For example, the tail lights may include motion sensors (not illustrated) and the power tailgate 114 may move when the motion sensors detect a specific hand gesture. In another example, the power tailgate 114 may move in response to a command input via a mobile device 152 communicatively coupled to the pick-up truck 100 (hereinafter referred as a connected mobile device).

The bed camera 116 is mounted above a rear window of the cabin 102, The bed camera 116 is positioned to capture images of the pick-up bed 104 and the power tailgate 114.

The side mirror cameras 118 are mounted on side view mirrors and are positioned to capture images of the walls 106 and partial views under the pick-up truck 100.

The tactile sensors 120 are disposed on the contact surface 112 such that the tactile sensors 120 are evenly separated from each other. The tactile sensors 120 are responsive to force applied thereon. The tactile sensors 120 contact the power tailgate 114 when the power tailgate 114 is in the closed position.

The tailgate torque sensors 122 measure an amount of force applied to the power tailgate 114. The tailgate torque sensors 122 includes a voltage/current sensor (not illustrated), a tailgate angle sensor (not illustrated), and a body angle sensor (not illustrated). The voltage/current sensor are electrically coupled to the power tailgate 114 and monitors an amount of voltage/current drawn by the power driver unit 134 to move the power tailgate. The tailgate angle sensor measures an angle at which the power tailgate 114 is positioned with respect to the pick-up bed 104. The angle sensor measures roll angle, pitch angle, and yaw angle of the pick-up truck 100. For example, the angle sensor may be a gyroscope. In some examples, the tailgate torque sensors 122 may include one or more pressure sensors (not illustrated).

The infotainment head unit 124 provides an interface between the pick-up truck 100 and a user. The infotainment head unit 124 is disposed within the cabin 102. The infotainment head unit 124 includes digital and/or analog interfaces (e.g., input devices and output devices) to receive input from the user(s) and display information. The input devices may include, for example, a control knob, an instrument panel, a digital camera for image capture and/or visual command recognition, a touch screen, an audio input device (e.g., cabin 102 microphone), buttons, or a touchpad. The output devices may include instrument cluster outputs (e.g., dials, lighting devices), actuators, a heads-up display, a center console display (e.g., a liquid crystal display ("LCD"), an organic light emitting diode ("OLED") display, a flat panel display, a solid state display, etc.), and/or speakers. In the illustrated example, the infotainment head unit 124 150 includes hardware (e.g., a processor or controller, memory, storage, etc.) and software (e.g., an operating system, etc.) for an infotainment system (such as SYNC® and MyFord Touch® by Ford®, Entune® by Toyota®, IntelliLink® by GMC®, etc.).

The communication module 126 of the illustrated example includes wired or wireless network interface(s) that enable communication with a mobile device 152, an external server, other pick-up truck 100s, etc. The communication module 126 includes hardware (e.g., processors, memory, storage, antenna, etc.) and software to control the wired or wireless network interface(s). In some examples, the communication module 126 includes a wireless personal area network (WPAN) module that is configured to wirelessly communicate with nearby device(s) via short-range wireless communication protocol(s). For example, the communication module 126 includes antenna(s) to wirelessly communicate via the Bluetooth® and/or Bluetooth® Low Energy (BLE) protocols. Additionally or alternatively, the communication module 126 includes antenna(s) to wirelessly communicate via Wi-Fi®, low frequency (LF) communication, Near-Field Communication (NFC), Radio-Frequency Identification (RFID), ultra-wide band (UWB) communication, ultra-high frequency (UHF) communication, and/or any other wireless communication protocol. Additionally or alternatively, the communication module 126 includes wired or wireless network interface(s) that enable communication with external networks. For example, the communication module 126 is configured to wirelessly communicate with a nearby device via an external network. The external network(s) may be a public network, such as the Internet; a private network, such as an intranet; or combinations thereof, and may utilize a variety of networking protocols now available or later developed including, but not limited to, TCP/IP-based networking protocols. For example, the communication module includes one or more communication controllers for cellular networks, such as Global System for Mobile Communications (GSM), Universal Mobile Telecommunications System (UMTS), Long Term Evolution (LTE), Code Division Multiple Access (CDMA).

The warning system 128 includes at least one speaker and/or display device. The warning system 128 generates visual and/or audible warnings based on a command generated by the on-board computing platform. In some examples, the warning system 128 may be defined by the infotainment head unit 124. In some examples, the warning system 128 may be defined by one or more connected mobile devices 152. In some examples, the warning system 128 may be defined by one or more external speaker/display.

The on-board computing platform 130 includes a processor or controller 142 and memory 144. In the illustrated example, the on-board computing platform 130 is structured to include a tailgate controller 146. Alternatively, in some examples, the tailgate controller 146 may be incorporated (partially or fully) into another ECU with its own processor and memory. The processor or controller 142 may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The memory 144 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, non-volatile solid-state memory, etc.), unalterable memory (e.g., EPROMs), read-only memory, and/or high-capacity storage devices (e.g., hard drives, solid state drives, etc). In some examples, the memory 144 includes multiple kinds of memory, particularly volatile memory and non-volatile memory.

The memory 144 is computer readable media on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 144, the computer readable medium, and/or within the processor 142 during execution of the instructions.

The terms "non-transitory computer-readable medium" and "tangible computer-readable medium" should be understood to include a single medium or multiple media, such as a centralized or distributed database, and/or associated caches and servers that store one or more sets of instructions. The terms "non-transitory computer-readable medium" and "tangible computer-readable medium" also include any tangible medium that is capable of storing, encoding or carrying a set of instructions for execution by a processor or that cause a system to perform any one or more of the methods or operations disclosed herein. As used herein, the term "tangible computer readable medium" is expressly defined to include any type of computer readable storage device and/or storage disk and to exclude propagating signals.

The tailgate controller 146 controls the power tailgate 114 and the warning system 128 based on sensory data collected by the bed camera 116, the side mirror cameras 118, tactile sensors 120, and/or the tailgate torque sensors 122.

Operations of the tailgate controller 146 are described in detail below.

At the outset, it is assumed that the such cameras and sensors are in a power-saving mode (e.g., drawing no power or minimum power to remain operational) and the power tailgate 114 is in the open position. When the power tailgate 114 is instructed to move to the closed position, the tailgate controller 146 powers the bed camera 116, the tactile sensors 120, and the tailgate torque sensors 122. At this time, the tailgate controller 146 monitors, via the bed camera 116, a tailgate movement zone 148 and controls the power tailgate 114 to move at a first speed. The tailgate movement zone 148 is predetermined by the tailgate controller 146 and includes an area embodying a closing path of the power tailgate 114 and one or more areas proximate to the closing path of the power tailgate 114. When the tail gate controller detects an object within the closing path of the power tailgate 114, the tailgate controller 146 determines whether the object is a person. For example, the tailgate controller 146 may use one or more image analysis techniques to determine whether the object is a person. If the object is a person, the tailgate controller 146 stops the power tailgate 114 and provides a warning to a user via the warning system 128. Thereafter, if the tailgate controller 146 receives an instruction to resume (e.g., via the infotainment head unit 124, a connected mobile device, or the switch), the tailgate controller 146 continues to monitor the tailgate movement zone 148 and controls the power tailgate 114 to move at a second speed slower than the first speed. This process may repeat until the power tailgate 114 moves to the closed position.

If the tailgate controller 146 determines that the object is not a person, the tailgate controller 146 determines whether the object is motion. For example, the tailgate controller 146 may render such determination by monitoring displacements of the object over a predetermined period. If the object is in motion, the tailgate controller 146 predicts a possibility of interaction between the moving object and the power tailgate 114 based on the velocity/trajectory of the moving object and the power tailgate 114. If the tailgate controller 146 predicts that no interaction would result between the moving object and the power tailgate 114, the tailgate controller 146 continues to monitor the tailgate movement zone 148 and controls the power tailgate 114 to move at the second speed. This process may repeat until the power tailgate 114 move to the closed position.

If the tailgate controller 146 determines that the object is static or predicts that an interaction would result between the moving object and the power tailgate 114, the tailgate controller 146 stops the power tailgate 114 and provides a warning to a user via the warning system 128. Thereafter, if the tailgate controller 146 receives an instruction to resume, the tailgate controller 146 continues to monitor the tailgate movement zone 148 and controls the power tailgate 114 to move at the second speed. This process may repeat until the power tailgate 114 move to the closed position.

If the tailgate controller 146 determines that the FOV of the bed camera 116 is obstructed from monitoring the tailgate movement zone 148, the tailgate controller 146 further powers the side mirror cameras 118 to monitor the one or more areas proximate to the closing/opening path of the power tailgate 114. Similar to the operations described above, the tailgate controller 146 may control the power tailgate 114 and the warning system 128 based on images captured by the side mirror cameras 118. It should be appreciated that the bed camera 116 and the side mirror cameras 118 may work in conjunction to monitor the tailgate movement zone 148. It should be appreciated that the tailgate controller 146 may initially use the side mirror cameras 118 to monitor the tailgate movement zone 148 and use the bed camera 116 when the FOVs of the side mirror cameras 118 are obstructed.

When the tactile sensors 120 are powered, the tailgate controller 146 uses such sensors to verify whether the power tailgate 114 is in the closed position. Specifically, a number of activated tactile sensors 120 increases as a degree between the power tailgate 114 and the contact surface 112 decreases. Therefore, when all of the tactile sensors 120 are activated, the tailgate controller 146 uses such indication as a factor for determining that the power tailgate 114 is in the closed position, and when less than all of the tactile sensors 120 are activated, the tailgate controller 146 uses such indication as a factor for determining that the power tailgate 114 is improperly closed. Additionally, when less than all of the tactile sensors 120 are activated, the tailgate controller 146 may determine a position of imperfect contact based on one or more positions of one or more activated tactile sensors 120. In some examples, the power tailgate 114 may render the determination of whether all or some of the tactile sensors 120 are activated after a predetermined period from instructing the power tailgate 114 to move. The predetermined period includes an expected period for which the power tailgate 114 moves from the open position to the closed position.

FIG. 2 illustrate an example scenario 200 demonstrating an improper contact between the power tailgate 114 and the contact surfaces 112 of FIGS. 1A and 1B. FIG. 2 illustrates a rear end view 200 of the pick-up truck 100. For illustrative purposes, the power tailgate 114 and the mechanical 140 have been omitted, however, in this example scenario, it is assumed that the power tailgate 114 is in an intermediate position between the open position and the closed position and has failed to move to the closed position due to a rod 202 lodged between the power tailgate 114 and one of the contact surfaces 112. In the example scenario 200, the contact surfaces 112 include a left contact surface 112 and a right contact surface 112. Each of the contact surfaces 112 include first to fourth tactile sensors 204, 206, 208, and 210 sequentially disposed thereon from the lowermost portion of said contact surface 112 to the uppermost portion of said contact surface 112. In the example scenario, the rod 202 is lodged between a lowermost area between the power tailgate 114 and the right contact surface 112. In some examples, the tailgate controller 146 generates a table 220 after the expected period. A left column 222 of the table 220 indicates the status of the first to fourth tactile sensors 204, 206, 208, and 210 on the left contact surface 112, and a right column 224 indicates the status of the first to fourth tactile sensors 204, 206, 208, and 210 on the right contact surface 112. In the illustrated example, "0" indicates that a tactile sensor is inactivated and "1" indicates that a tactile sensor is activated. In the illustrated example, the table 220 indicates that the first tactile sensor 204 of the right contact surface 112 is activated and indicating that the remaining tactile sensors are inactivated. Based on the table 220, the tailgate controller 146 may present such information to the user and/or issue a warning via the warning system 128.

When the tailgate torque sensors 122 are powered, the tailgate controller 146 monitors an amount of force applied to the power tailgate 114 while the power tailgate 114 is in motion and controls the power tailgate 114 and the warning system 128 based on the amount. For example, the tailgate controller 146: (1) uses the voltage/current sensor to determine an amount of current/voltage drawn for moving the power tailgate 114; (2) compares the amount to a threshold; and (3) when the amount is greater than the threshold for a threshold period, transmits one or more commands to the power tailgate 114 or the warning system 128. For example, such command may cause the power tailgate 114 to stop and/or allow a user to manually control the power tailgate 114. Additionally or alternatively, such command may cause the warning system 128 to issue a warning to the user. In some examples, if a hydraulic device or a pneumatic device is used to maneuver the power tailgate 114, the tailgate torque sensors 122 may function as pressure sensors, and the tailgate controller 146 may monitor the amount of force applied to the power tailgate 114 based on the pressure sensor.

Figure 3A:
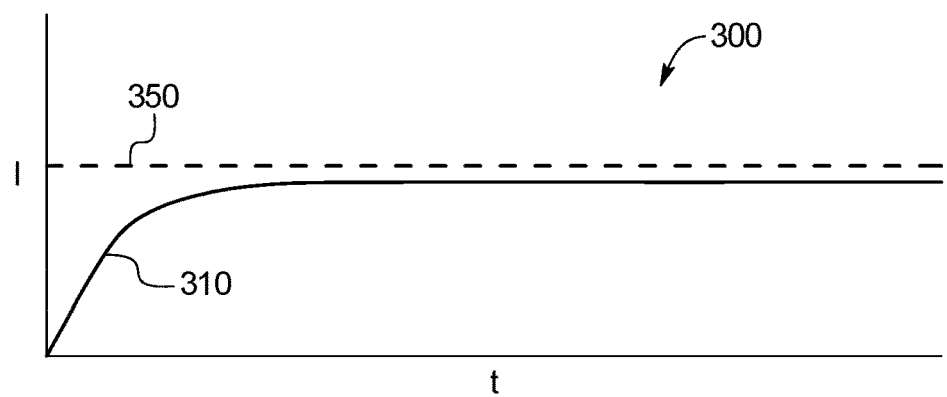
FIGS. 3A-3C illustrate example graphs demonstrating an amount power drawn to maneuver the power tailgate of FIGS. 1A and 1B in a plurality of scenarios.
Figure 3B:
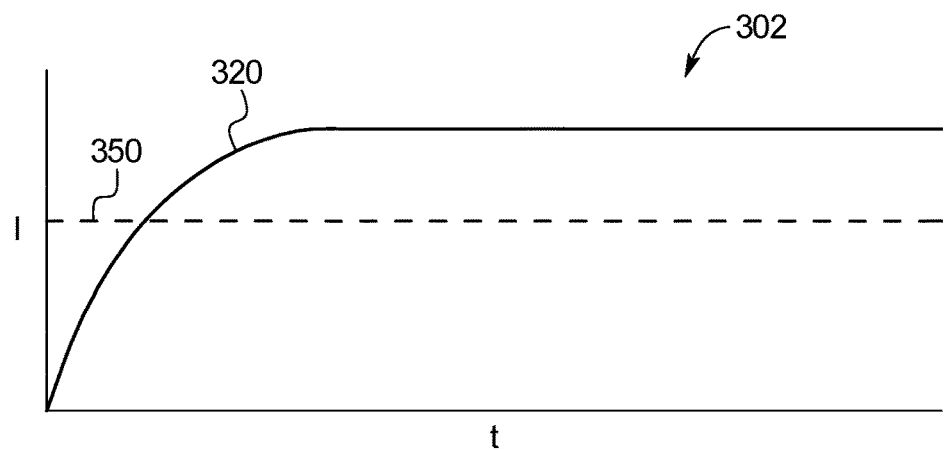
Figure 3C:
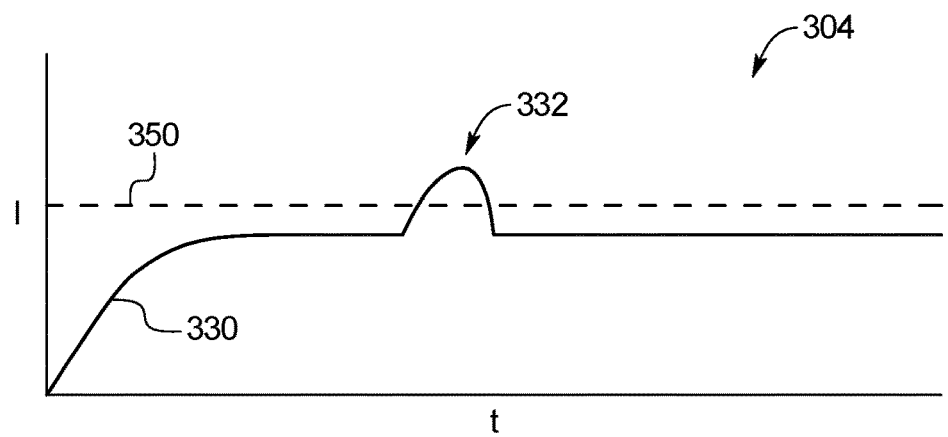

FIGS. 3A-3C illustrate example graphs demonstrating an amount of power drawn to maneuver the power tailgate 114 in a plurality of scenarios. Each of the graphs include a vertical axis indicating current drawn by the power tailgate 114 and a horizontal axis indicating time elapsed.

FIG. 3A illustrates a first example graph 300 demonstrating an amount of power drawn to maneuver the power tailgate 114 in a first scenario. In the first scenario, it is assumed that that the movement of the power tailgate 114 is unobstructed. The first graph 300 illustrates an amount of current drawn to move the power tailgate 114 over a predetermined period. A first line 310 indicates an amount of current drawn over a period in the first scenario. Initially, the power tailgate 114 draws current over time to move the power tailgate 114 to a desired speed. Subsequently, the current stabilizes as the power tailgate 114 reaches the desired speed. In the illustrated example, the first line 310 does not exceed a threshold line 350. Therefore, tailgate controller 146 does not issue a command to the power tailgate 114 or the warning system 128.

FIG. 3B illustrates a second example graph 302 demonstrating an amount of power drawn to maneuver the power tailgate 114 in a second scenario. In the second scenario, it is assumed that that the movement of the power tailgate 114 is obstructed. For example, it is assumed that a load is disposed on the power tailgate 114 when the power tailgate 114 is instructed to move. A second line 320 indicates an amount of current drawn to move the power tailgate 114 over a period in the second scenario. Initially, the power tailgate 114 attempts to draw current to reach a desired speed. Since the load prevents the power tailgate 114 to reach the desired speed, the power tailgate 114 attempts draw additional current. After some time, the second line 320 plateaus since the power tailgate 114 reaches a limit at which the power tailgate 114 is able to draw current. Since the second line 320 exceeds the threshold line 350, the tailgate controller 146 generates one or more commands to the power tailgate 114 and/or the warning system 128.

FIG. 3C illustrates a third example graph 304 demonstrating an amount of power drawn to maneuver the power tailgate 114 in a third scenario. In the second scenario, it is assumed that that the movement of the power tailgate 114 is temporarily obstructed. For example, it is assumed that a user temporarily grabs the power tailgate 114 while the power tailgate 114 is moving during the stabilization period. A third line 330 indicates an amount of current drawn to move the power tailgate 114 over a period in the third scenario. When the power tailgate 114 is temporarily obstructed, the third line 330 undergoes a temporary deviation 332. In some examples, the tailgate controller 146 may ignore the temporary deviation 332. In some examples, if the temporary deviation is greater than a predetermined period, the power tailgate 114 may generate one or more commands.

In some examples, the tailgate controller 146 may alter the threshold (e.g., 350 as illustrated in FIGS. 3A-3C) based on one or more factors. One of the factors includes the pitch angle of the pick-up truck 100 measured by the body angle sensor. Since gravity affects an amount of current drawn to maneuver the power tailgate 114, the tailgate controller 146 adjusts the threshold based on angle at which the pick-up truck 100 is positioned. For example, the tailgate controller 146 may increase the threshold when the pitch angle indicates that the pick-up truck 100 is positioned on an incline. In another example, the tailgate controller 146 may lower the threshold when the pitch angle indicates that the pick-up truck 100 is positioned on a decline. In some examples, the tailgate controller 146 may assign a level of threshold for each of a plurality of angles at which the pick-up truck 100 is positioned. In some examples, the one or more factors may further include the yaw angle and the roll angle of the pick-up truck 100.

While FIGS. 3A-3C demonstrate that measurements of force applied to the power tailgate 114 are derived based on the amount of power drawn to maneuver the power tailgate 114, it should be appreciated that the measurements of force applied to the power tailgate 114 can be derived based on pressure applied to maneuver the power tailgate 114. For example, if the mechanical arm 140 was replaced with a hydraulic device or a pneumatic device, the amount of force applied to the power tailgate 114 can be measured based on the amount of pressure applied the hydraulic device or the pneumatic device.

In some examples, the tailgate controller 146 may use one of a group consisting the bed camera 116, the side mirror cameras 118, the tactile sensors 120, and the tailgate torque sensors 122 as a main device and a different one of from said group as a back-up/verification device. For example, the tailgate controller 146 may initially use the tailgate torque sensors 122 to detect whether an object is disposed on the power tailgate 114, and if the tailgate torque sensors 122 indicate that an object is disposed on the power tailgate 114, the tailgate controller 146 may use the bed camera 116 to verify whether an object is actually disposed on the power tailgate 114.

Figure 4:
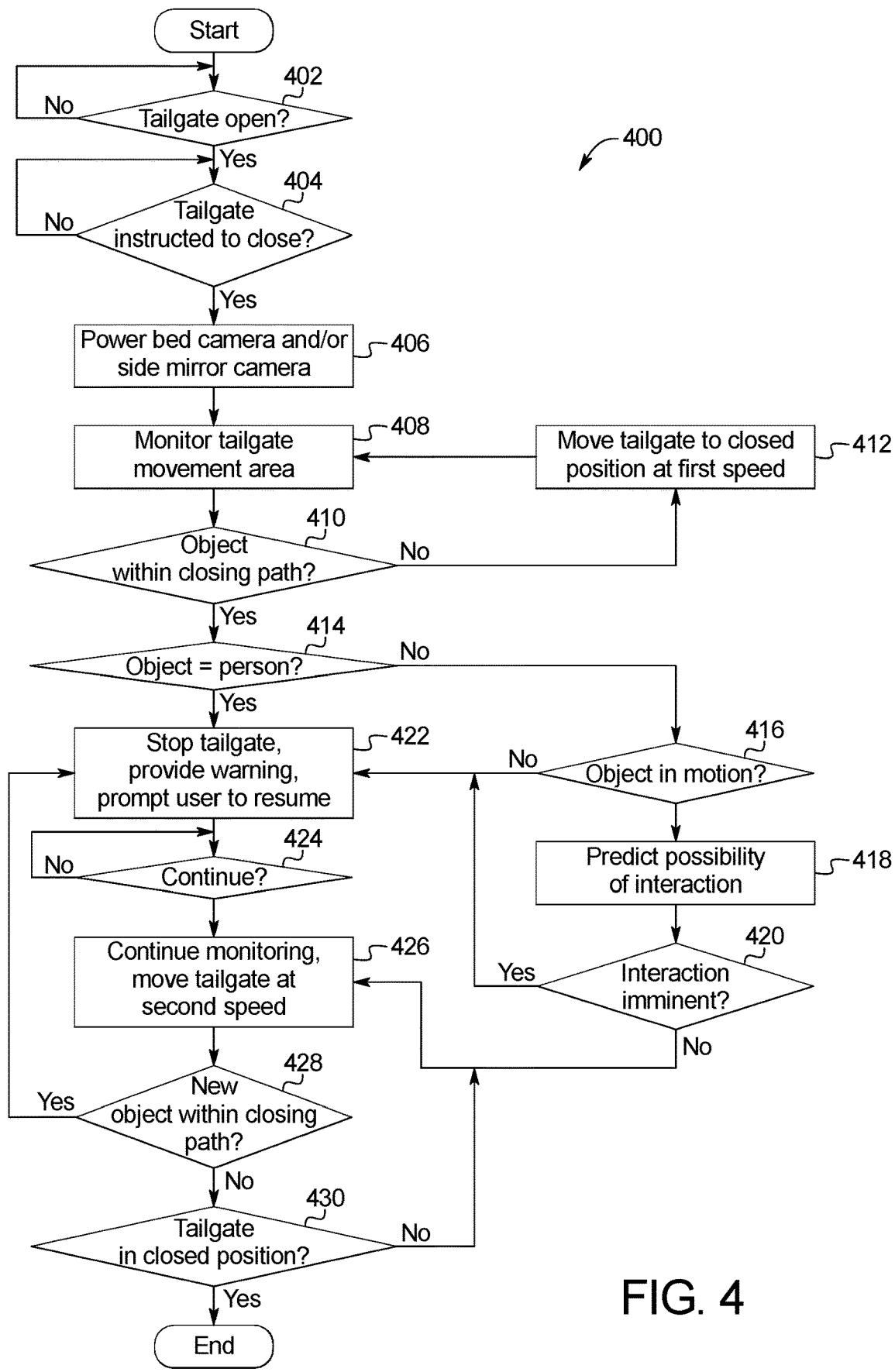
FIG. 4 illustrates a first flowchart chart of a method for operating the tailgate controller 146 of FIG. 1A.

FIG. 4 illustrates a first flowchart chart of a method for operating the tailgate controller 146 of FIG. 1A.

At block 402, the tailgate controller 146 determines whether the power tailgate 114 is in the open position. If so, the method continues to 404. Otherwise, the method returns to block 402.

At block 404, the tailgate controller 146 determines whether the power tailgate 114 is instructed to move. If so, the method continues to 406. Otherwise, the method returns to block 404.

At block 406, the tailgate controller 146 powers the bed camera 116 and/or the side mirror cameras 118.

At block 408, the tailgate controller 146 monitors, via the bed camera 116 and/or the side mirror cameras 118, the tailgate movement zone 148.

At block 410, the tailgate controller 146 determines whether an object is detected within the closing path. If so, the method continues to block 414. Otherwise the method continues to block 412.

At block 412, the tailgate controller 146 moves the tailgate to the closed position at a first speed.

At block 414, the tailgate controller 146 determines whether the object is a person. If so, the method continued to block 422. Otherwise, the method continues to block 416.

At block 416, the tailgate controller 146 determines whether the object is in motion. If so, the method continues to block 418. Otherwise, the method continues to block 422.

At block 418, the tailgate controller 146 predicts a possibility of an interaction between the power tailgate 114 and the object based on velocity/trajectory of the power tailgate 114 and the object.

At block 420, the tailgate controller 146 determines whether an interaction between the object and the power tailgate 114 is imminent. If so, the method continues to block 422. Otherwise, the method continues to block 426.

At block 422, the tailgate controller 146 stops the power tailgate 114, transmits a warning via the warning system 128, and prompts, via a user, via the infotainment head unit 124 or the connected mobile device, whether the power tailgate 114 should resume moving.

At block 424, if the user wishes to resume, the method continues to block 426. Otherwise, the method returns to block 424.

At block 426, the tailgate controller 146 continues to monitor, via the bed camera 116 and/or the side mirror cameras 118, the tailgate movement zone 148 and moves the power tailgate 114 at a second speed slower than the first speed.

At block 428, the tailgate controller 146 determines whether a new object is within the closing path. If so, the method continues to block 422. Otherwise, the method continues to block 430.

At block 430, the tailgate controller 146 determines whether the tailgate is in the closed position. If so, the method terminates. Otherwise, the method returns to block 426.

Figure 5:
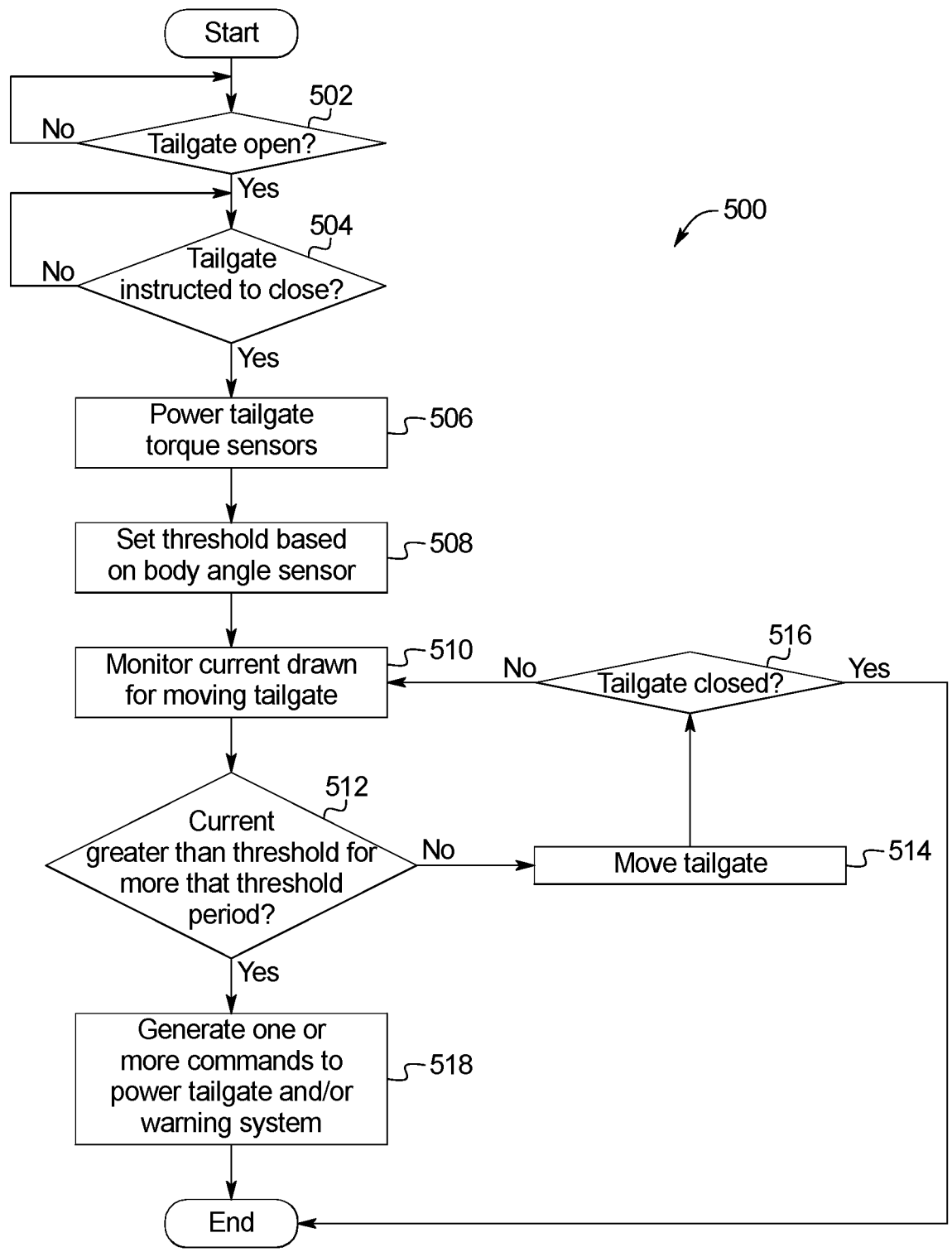
FIG. 5 illustrates a second flowchart chart of a method for operating the tailgate controller 146 of FIG. 1A.

FIG. 5 illustrates a second flowchart chart of a method for operating the tailgate controller 146 of FIG. 1A.

At block 502, the tailgate controller 146 determines whether the power tailgate 114 is in the open position. If so, the method continues to 504. Otherwise, the method returns to block 502.

At block 504, the tailgate controller 146 determines whether the power tailgate 114 is instructed to move. If so, the method continues to 506. Otherwise, the method returns to block 504.

At block 506, the tailgate controller 146 powers the tailgate torque sensors 122.

At block 508, the tailgate controller 146 sets a threshold based on readings of the body angle sensor. For example, the tailgate controller 146 may determine the threshold based on the pitch angel of the pick-up truck 100.

At block 510, the tailgate controller 146 monitors an amount of current drawn for moving the tailgate over time.

At block 512, the tailgate controller 146 determines whether the amount of current is greater than the threshold for more than a threshold period. If so, the method continues to block 518. Otherwise, the method continues to block 514.

At block 514, the tailgate controller 146 moves the tailgate.

At block 516, the tailgate controller 146 determines whether the tailgate is in the closed. If so, the method terminates. Otherwise, the method continues to block 510.

At block 518, the tailgate controller 146 generates one or more commands to control the movement of the power tailgate 114 and/or provides a warning to a user via the warning system 128.

Figure 6:
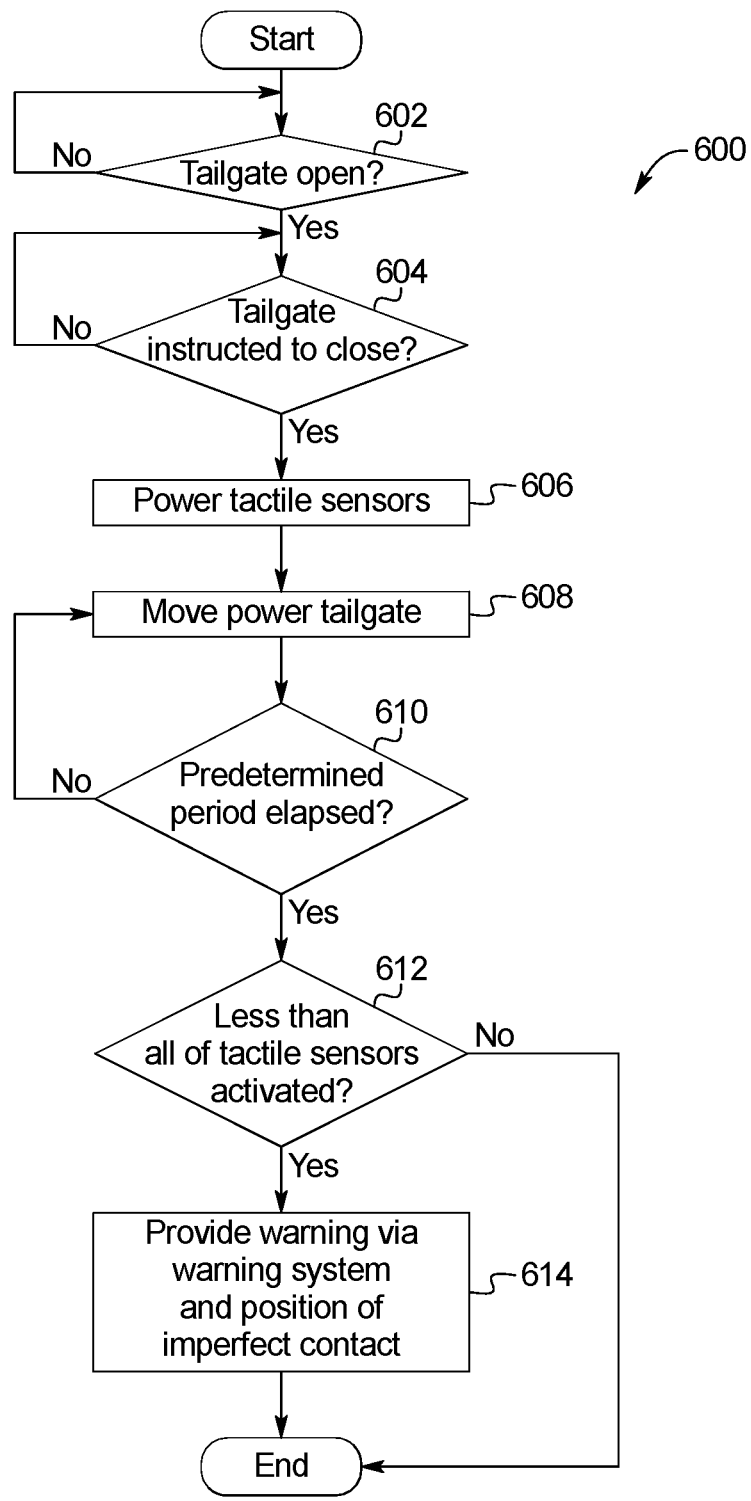
FIG. 6 illustrates a third flowchart chart of a method for operating the tailgate controller 146 of FIG. 1A.

FIG. 6 illustrates a third flowchart chart of a method for operating the tailgate controller 146 of FIG. 1A.

At block 602, the tailgate controller 146 determines whether the power tailgate 114 is in the open position. If so, the method continues to 604. Otherwise, the method returns to block 602.

At block 604, the tailgate controller 146 determines whether the power tailgate 114 is instructed to move. If so, the method continues to 606. Otherwise, the method returns to block 604.

At block 606, the tailgate controller 146 powers the tactile sensors 120.

At block 608, the tailgate controller 146 moves the power tailgate 114.

At block 610, the tailgate controller 146 determines whether a predetermine period has elapsed. As mentioned above, the predetermined period includes an expected period for which the power tailgate 114 moves from the open position to the closed position.

At block 612, the tailgate controller 146 determines whether less than all of the tactile sensors 120 have been activated. If so, the method continues to block 614. Otherwise, the method terminates.

The flowcharts of FIGS. 4-6 are representative of machine readable instructions stored in memory (such as the memory of FIG. 4) that comprise one or more programs that, when executed by a processor (such as the processor of), cause the pick-up truck 100 to implement the example tailgate controller 146 of FIG. 1A. Further, although the example program(s) is/are described with reference to the flowcharts illustrated in FIGS. 4-6, many other methods of implementing the example tailgate controller 146 and/or, more generally, the example tailgate controller 146 may alternatively be used. For example, the order of execution of the blocks may be changed, and/or some of the blocks described may be changed, eliminated, or combined. It should be appreciated that one or more of the flowcharts of FIGS. 4-6 may be concurrently performed by the tailgate controller 146 of FIG. 1A.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". As used here, the terms "module" and "unit" refer to hardware with circuitry to provide communication, control and/or monitoring capabilities, often in conjunction with sensors. "Modules" and "units" may also include firmware that executes on the circuitry. The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A pick-up truck comprising:
a pick-up bed;
a power tailgate connected to the pick-up bed;
a motor configured to move the power tailgate along a path;
a camera;
processors configured to, while the power tailgate is automatically moving, responsive to detecting, via the camera, any object within the path, stop the power tailgate;
walls connected to edges of the pick-up bed, a portion of the walls defining a truck tail, the truck tail configured to engage the power tailgate when the power tailgate is in a closed position; and
tactile sensors disposed on the truck tail, wherein the processors are further configured to, responsive to the power tailgate being in the closed position and responsive to less than all of the tactile sensors being activated, generate a warning command.

2. The pick-up truck of claim 1, further comprising sensors, wherein the processors are further configured to, while the power tailgate is automatically moving, responsive to detecting, via the sensors, a level of force exerted on the power tailgate satisfying a threshold, stop the power tailgate.

3. The pick-up truck of claim 2, further comprising a pitch sensor, wherein the processors are further configured to: responsive to detecting, via the pitch sensor, an angle of a pitch of the pick-up truck satisfying a pitch angle, adjust the threshold.

4. The pick-up truck of claim 2, further comprising a pitch sensor, wherein the processors are further configured to: responsive to detecting, via the pitch sensor, that the pick-up truck is positioned in an incline, increase the threshold.

5. The pick-up truck of claim 2, further comprising a pitch sensor, wherein the processors are further configured to: responsive to detecting, via the pitch sensor, that the pick-up truck is positioned in a decline, decrease the threshold.

6. The pick-up truck of claim 1, wherein the processors are further configured to learn a range of degrees at which the power tailgate is able to move.

7. The pick-up truck of claim 1, further comprising side mirror cameras, wherein the processors are further configured to, while the power tailgate is automatically moving and responsive to a view of the camera being obstructed:
monitor, via the side mirror cameras, an area surrounding the power tailgate; and
responsive to detecting, via the side mirror cameras, any object within the area, stop the power tailgate.

8. The pick-up truck of claim 1, further comprising a speaker, wherein the processors are further configured to, responsive to detecting, via the camera, any object within the path, provide an audible warning though the speaker.

9. The pick-up truck of claim 1, wherein a mobile device is wirelessly coupled to the processors, and wherein the processors are further configured to, responsive to detecting, via the camera, any object within the path, cause the mobile device to provide a warning to a user.

10. The pick-up truck of claim 1, further comprising:
an arm connecting the power tailgate and the pick-up bed, wherein the arm is one of a group consisting: a hydraulic device and a pneumatic device, and wherein the motor is further configured to drive the arm to move the power tailgate along the path; and
pressure sensors configured to measure pressure applied to the arm, wherein the processors are further configured to while the power tailgate is automatically moving, responsive to detecting, via the pressure sensors, a level of pressure satisfying a threshold, stop the power tailgate.

11. A method of operating a power tailgate of a pick-up truck, the method comprising:
automatically moving the power tailgate along a path via a motor; and
while the power tailgate is automatically moving, responsive to detecting, via a camera, any object within the path, stopping the power tailgate while the power tailgate is automatically moving and responsive to a view of the camera being obstructed:
monitoring, via side mirror cameras, an area surrounding the power tailgate; and
responsive to detecting, via the side mirror cameras, any object within the area, stopping the power tailgate.

12. The method of claim 11, further comprising: while the power tailgate is automatically moving, responsive to detecting, via sensors, a level of force exerted on the power tailgate satisfying a threshold, stop the power tailgate.

13. The method of claim 12, further comprising, responsive to detecting, via a pitch sensor, an angle of a pitch of the pick-up truck satisfying a pitch angle, adjusting the threshold.

14. The method of claim 12, further comprising, responsive to detecting, via a pitch sensor, that the pick-up truck is positioned in an incline, increasing the threshold.

15. The method of claim 12, further comprising, responsive to detecting, via a pitch sensor, that the pick-up truck is positioned in a decline, decreasing the threshold.

16. The method of claim 11, further comprising:
responsive to the power tailgate being in a closed position, activating tactile sensors; and
responsive to the power tailgate being in the closed position and responsive to less than all of tactile sensors being activated, generating a warning command.

17. The method of claim 11, further comprising learning a range of degrees at which the power tailgate is able to move.

18. The method of claim 11, further comprising responsive to detecting, via the camera, any object within the path, providing an audible warning though a speaker.

19. The method of claim 11, further comprising, responsive to detecting, via the camera, any object within the path, causing a mobile device wirelessly coupled to the pick-up truck to provide a warning to a user.

20. A non-transitory, computer readable medium storing instructions that are executable by at least one processor to perform operations comprising:
causing a power tailgate to automatically move along a path via a motor;
while the power tailgate is automatically moving, responsive to detecting, via a camera, any object within the path, stopping the power tailgate; and
while the power tailgate is automatically moving and responsive to a view of the camera being obstructed:
monitoring, via side mirror cameras, an area surrounding the power tailgate; and
responsive to detecting, via the side mirror cameras, any object within the area, stopping the power tailgate.

* * * * *